US000001820H

United States Statutory Invention Registration [19]

[11] Reg. Number: H1,820

Graves et al.

[45] Published: Dec. 7, 1999

[54] METHOD FOR HEATING ACTUATING FLUID IN A FUEL SYSTEM

[75] Inventors: Jeffrey D. Graves, Chenoa; Norman D. Knapp, Roanoke; Korby A. Koch, Rome, all of Ill.

[73] Assignee: Caterpillar Inc., Peoria, Ill.

[21] Appl. No.: 09/218,960

[22] Filed: Dec. 22, 1998

[51] Int. Cl.[6] ..... F02M 31/00

[52] U.S. Cl. ..... 123/557; 123/549

[56] References Cited

U.S. PATENT DOCUMENTS

| | | | |
|---|---|---|---|
| 5,095,866 | 3/1992 | Burke | 123/179.14 |
| 5,189,280 | 2/1993 | Okazaki et al. | 219/270 |
| 5,216,990 | 6/1993 | Moosmann et al. | 123/145 A |
| 5,331,937 | 7/1994 | Clarke | 123/491 |
| 5,367,996 | 11/1994 | Homik et al. | 123/179.8 |
| 5,385,126 | 1/1995 | Matthews | 123/179.21 |
| 5,392,749 | 2/1995 | Stockner et al. | 123/470 |
| 5,529,035 | 6/1996 | Hunt et al. | 123/179.15 |
| 5,634,443 | 6/1997 | Mathews | 123/179.21 |
| 5,664,547 | 9/1997 | Klak et al. | 123/549 |

*Primary Examiner*—Harold J. Tudor
*Attorney, Agent, or Firm*—W. Bryan McPherson

[57] ABSTRACT

The present invention includes an apparatus adapted to heat actuating fluid in a rail passage located within an engine. The rail passage is connected to an fluid inlet of at least one fuel injector. The apparatus includes a heating device located within the rail passage. The heating device is adapted to heat the actuating fluid, in response to a control signal. The apparatus also includes a temperature sensing device located within the rail passage. The temperature sensing device is adapted to sense a temperature of the actuating fluid and responsively generate a temperature signal. In the preferred embodiment, the apparatus also includes an electronic controller adapted to receive the temperature signal, determine a temperature of the fluid, and responsively generate the control signal and deliver an injection command signal to the fuel injector.

5 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR HEATING ACTUATING FLUID IN A FUEL SYSTEM

TECHNICAL FIELD

This invention relates generally to a fuel system, and more particularly, to a method and apparatus adapted to heat actuating fluid in a rail passage located within an engine.

BACKGROUND ART

In a fuel system having hydraulically-actuated electronically controlled unit injectors (HEUI), high pressure hydraulic actuating fluid flows from a common rail passage, or manifold, and into a chamber located within the injector. The fluid pushes down on a plunger which pushes fuel out from a plunger cavity, and out the injector through a nozzle. A solenoid, located within the injector, controls when, the high pressure, actuating fluid is exposed to the plunger by moving a poppet valve. The amount of fuel injected is controlled by adjusting the duration the solenoid is on.

The viscosity of the actuating fluid effects both the amount of fuel delivered by the injector, and when the delivery process begins. For example, in cold temperatures the actuating fluid is thicker (more viscous) than at warm temperatures. Therefore, when an electrical signal is delivered to a solenoid, commanding the solenoid to deliver actuating fluid to the injector, the fluid flows at a slower rate into the chamber to push against the plunger. With the actuating fluid moving at a slower rate there is an increased delay before the injector begins delivering fuel. Furthermore, when the solenoid is again turned off to stop delivery of the fuel, the reduced flow rate of the actuating fluid results in less total fuel being injected between when the solenoid is turned on and off. Hence, with a high viscous actuating fluid seen at cold starting temperatures as compared to higher temperature operating conditions, an inaccurate amount of fuel is delivered by the injectors and then starting/stopping, or "injection" fuel delivery shifts. Under these conditions, overall engine performance is adversely effected, resulting in incomplete combustion, low power, white smoke, etc.

The viscosity of the actuating fluid is a function of the fluid type and the temperature of the fluid. In an operating engine, neither the type of fluid, nor the temperature is fixed. Therefore it is difficult to predict the viscosity of the fluid as the temperature varies, and then appropriately account for the viscosity changes.

The reduction in fuel delivery and delays in timing increase as the viscosity of the actuating fluid increases. If the changes in viscosity are not accounted for, the fuel delivery and timing may be incorrect making it difficult to start and run the engine especially at high viscosities encountered at cold temperatures. If the fuel delivery is too small the engine may not start or be underpowered. If the fuel delivery is too large the engine structural capabilities may be exceeded, or excessive smoke produced and misfire may occur.

The present invention is directed to overcoming one or more of the problems identified above.

DISCLOSURE OF THE INVENTION

The one aspect of the present invention, an apparatus is adapted to heat actuating fluid in a rail passage located within an engine is disclosed. The rail passage is connected to a fluid inlet of at least one fuel injector. The apparatus includes a heating device located within the rail passage, the heating device is adapted to heat the actuating fluid in response to a control signal, a temperature sensing device is located within the manifold, the sensing device is adapted to sense a temperature of the actuating fluid and responsively generate a temperature signal, and an electronic controller is adapted to receive the temperature signal, responsively determine a temperature of the fluid and generate the control signal.

In another aspect of the present invention, a method of heating actuating fluid in a rail passage located within an engine is disclosed. The rail passage is connected to a fluid inlet of at least one fuel injector. The method includes the steps of determining a temperature of the actuating fluid, and energizing a heating element located in the rail passage in response to the temperature.

BEST MODE FOR CARRYING OUT THE INVENTION

Figure 1:
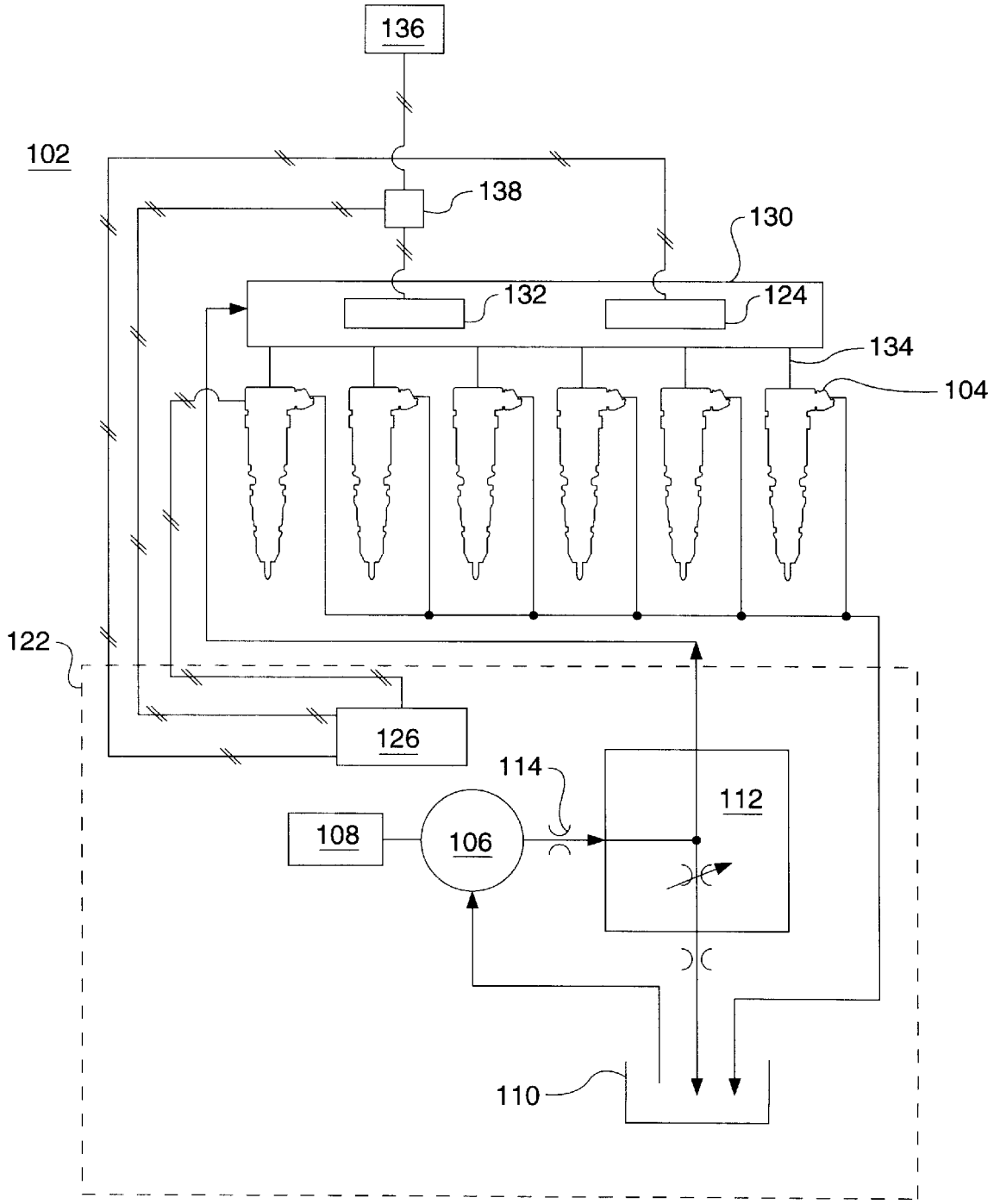
FIG. 1 is a schematic high level diagram of one embodiment of an fuel system.

The present invention provides an apparatus adapted to heat the actuating fluid located within the rail passage of an engine. FIG. 1 is an illustration of one embodiment of a fuel system 102 of an engine. The fuel system 102 includes at least one hydraulically-actuated electronically-controlled injector (HEUI) 104 for each combustion chamber or cylinder (not shown) of the fuel system 102. The fuel system 102 also includes a circuit 122 for supplying hydraulically-actuating fluid to each injector 104. In one embodiment the circuit 122 includes a pump 106, driven by an internal combustion engine 108. The output of the pump 106 is connected to at least one fluid rail passage (or manifold) 130, and also to a fluid sump (or tank) 110. The fluid sump 110 is also attached, through a return line, back to the pump 106. The fluid rail passage 130 is connected to each injector 104 via a rail branch passage 134. Each injector 104 is also connected to the fluid sump 110 in order to return the actuating fluid to the sump 110.

The circuit 122 includes a pressure control valve 112 for regulating how much actuating fluid flows to the injectors 104 as opposed to the fluid sump 110. By adjusting how much of the actuating fluid flow provided by the pump 106 goes to the injectors 104 as compared to the sump 110, the pressure of the fluid supplied to the injectors 104 may be regulated.

The circuit 122 includes a temperature sensing device 124. The temperature sensing device 124 is located in the rail passage 130. The temperature sensing device 124 senses the temperature of the actuating fluid within the rail passage 130, and responsively generates a fluid temperature signal. In one embodiment, the temperature sensing device 124 is a temperature transducer. In the preferred embodiment, the actuating fluid is petroleum based oil. However, the fluid may be a synthetic oil, fuel, or other type of non-compressible fluid.

The circuit 122 includes a heating device 132. In the preferred embodiment, the heating device is located in the rail passage 130. The heating device 132 is adapted to be energized in response to a control signal.

The circuit 122 includes an electronic controller 126. In the preferred embodiment, the controller 126 receives the temperature signal, and responsively generates a control signal. The controller 126 generates the control signal on an electrical path 140. In addition, the controller 126 generates and delivers an injection command signal to the injector 104. The injector 104 injects fuel into the cylinder in response to receiving the injection command signal.

The present invention includes a method for heating the actuating fluid within the rail passage 130 located within an engine. The rail passage is connected to at least one fuel injector 104. The method includes the step of determining a temperature of the actuating fluid, heating the actuating fluid in response to the temperature, and delivering an injection command to the injector in response to the temperature of the actuating fluid.

Figure 2:
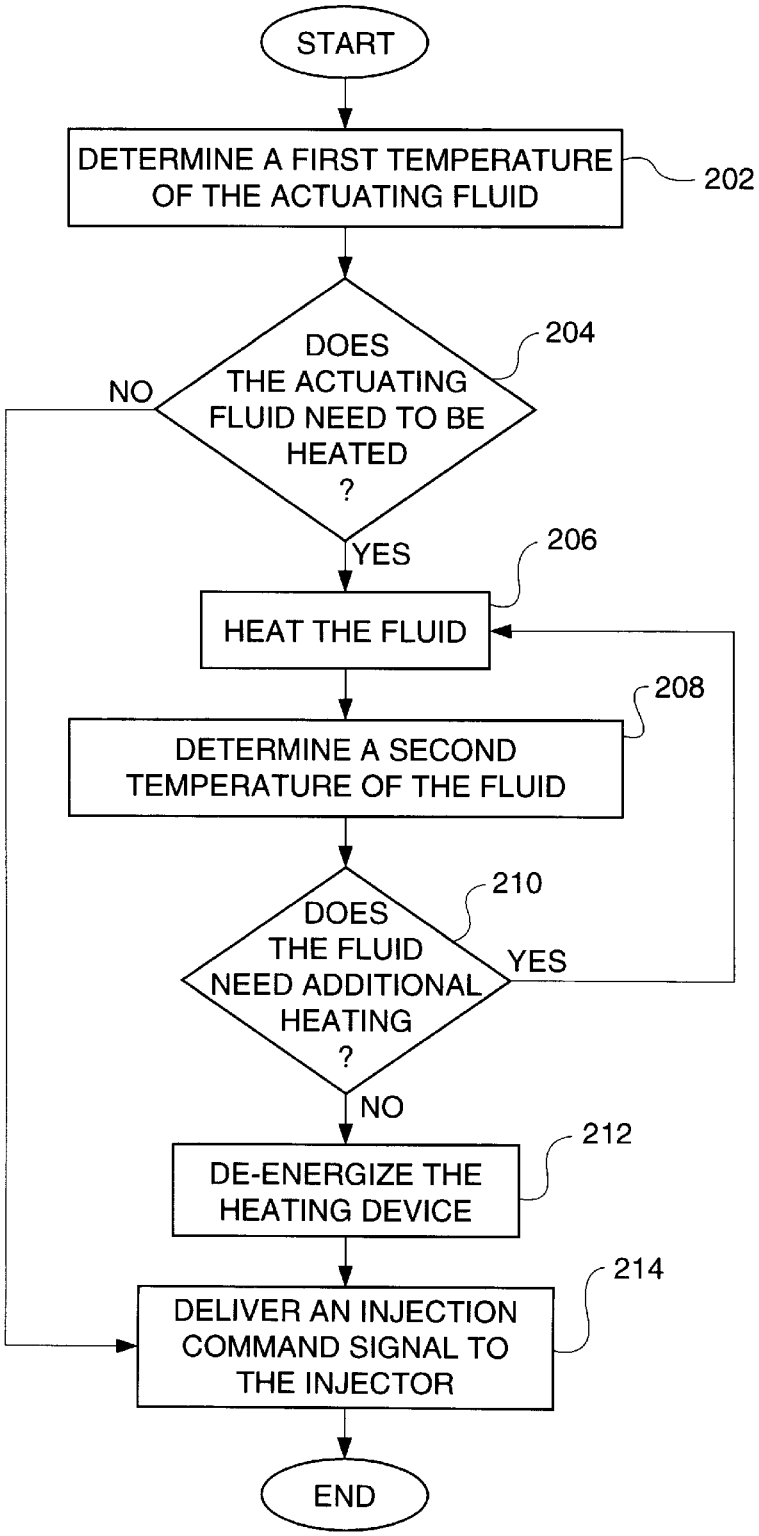
FIG. 2 is an illustration of one method for heating actuating fluid in a rail passage of an engine.

FIG. 2 illustrates a flow diagram of the method for heating actuating fluid in a rail passage located within an engine. In a first control block 202 the temperature of the actuating fluid is determined. In the preferred embodiment the temperature sensing device 124 is located within the rail passage 130. During the normal operation of an engine, the pump 106 forces the actuating fluid through the rail passage 130, and into the injector 104 (at the appropriate time). The fluid returns to a fluid sump 110 when it leaves the injector 104. When the engine is turned off there is a volume of fluid that remains in the rail passage 130. In one example, there may be one liter of fluid that remains in the rail passage 130. When the engine starts, the fluid is again circulated through the circuit 122.

In the preferred embodiment, the fluid temperature is sensed prior to the engine starting, i.e., prior to the controller 126 delivering an injection command signal to the injector 104.

In a second control block 204, a determination is made as to whether the actuating fluid needs to be heated. In the preferred embodiment, the controller 126 receives the temperature signal and responsively determines whether to heat the fluid. In one embodiment, the fluid temperature may be compared to a temperature threshold. If the fluid temperature is lower than the temperature threshold, then the fluid will be heated. The temperature threshold may be empirically determined based on the fluid temperature needed to obtain appropriate responsiveness of the injector 104. That is, the threshold may be the temperature needed to enable proper cylinder firing in response to the injection command. One example of a temperature threshold may be 0 degrees Celsius. If the temperature exceeds the threshold, then control may pass to a seventh control block 214 to begin injecting fuel, as described below. If the fluid temperature does not exceed the threshold, then the controller 126 may generate a control signal, thereby enabling the heating device 132 to be energized in order to heat the fluid.

Figure 3:
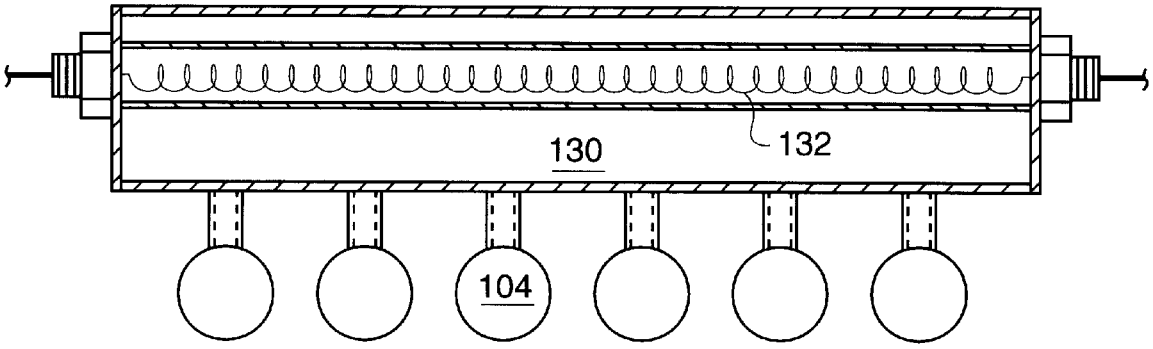
FIG. 3 is one embodiment of a heating element located in a rail passage.

In a third control block 206 the heating device heats the actuating fluid in response to the fluid temperature and the control signal. In one embodiment, the heating device 132 is a heating coil, as illustrated in FIG. 3. One heating coil 132 may be used to heat the fluid within the rail passage 130. In an alternative embodiment, multiple heating coils 132 may be located in the rail passage 130. When the heating coil 132 is energized, the heating coil 132 begins heating the fluid. In the preferred embodiment, the heating coil 132 is connected to a battery 136. A relay 138 may be used to control when the heating coil 132 is connected to the battery 136 and is being energized. The relay 138 is controlled by the control signal generated by the controller 126. Therefore when the controller 126 determines the fluid needs to be heated, the controller 126 delivers the control signal to the relay 138 such that the circuit between the battery 136 and the heating coil 132 is closed, thereby energizing the coil 132 and heating the fluid.

The controller 126 then determines whether the fluid is heated to the threshold. In a fourth control block 208, the controller 126 determines a second fluid temperature. In a fifth control block 210, the second fluid temperature is compared to the temperature threshold to determine if the fluid needs to continue to be heated. If the second temperature does not exceed the threshold then control returns to the third control block 206 continue heating the fluid. If the temperature does exceed the threshold then control is passed to a sixth control block 212. In the sixth control block 212 the controller 126 de-energizes the heating device 132 in a manner to stop the heating of the fluid. In one embodiment, the controller 126 delivers a control signal to the relay 138 such that the circuit between the battery 136 and the heating coil 132 is opened, thereby de-energizing the coil 132. In a seventh control block 214, the controller 126 delivers an injection command signal to the injector 104 to begin the injection of fuel into the cylinder, thereby starting the engine.

Figure 4:
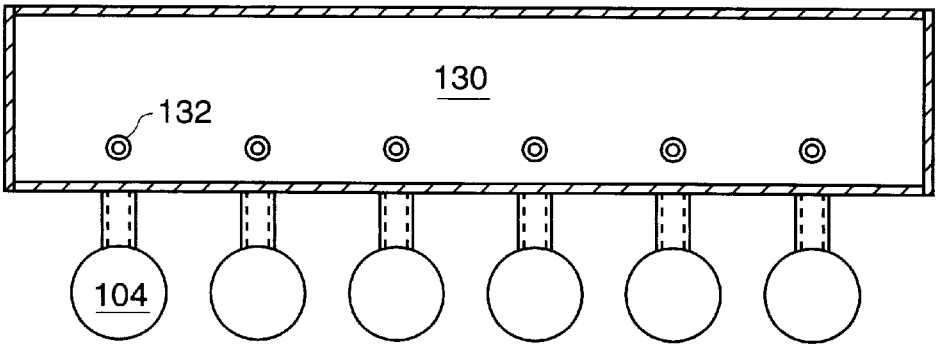
FIG. 4 is one embodiment of a heating element located in a rail passage.

In an alternative embodiment, the heating device 132 may be a glow plug, as illustrated in FIG. 4. One glow plug may be used to heat the fluid within the rail passage 130. In an alternative embodiment, one glow plug may be located adjacent to each of the rail branch passages. When the glow plug 132 is energized, i.e., the circuit between the glow plug 132 and the battery 136 is closed, the glow plug 132 begins heating the fluid.

In an alternative embodiment the heating device 132 and the temperature sensing device 124 may be located in the fluid sump 110.

Industrial Applicability

The present invention includes an apparatus adapted to heat actuating fluid in a rail passage 130 located within an engine. The rail passage 130, or manifold, is connected to a fluid inlet of at least one fuel injector 104. The apparatus includes a heating device 132 located within the rail passage 130. The heating device 132 is adapted to heat the actuating fluid, in response to a control signal. The apparatus also includes a temperature sensing device 124 located within the rail passage 130. The temperature sensing device 124 is adapted to sense a temperature of the actuating fluid and responsively generate a temperature signal. In the preferred embodiment, the apparatus also includes an electronic controller 126 adapted to receive the temperature signal, determine a temperature of the fluid, and responsively generate the control signal and deliver an injection command signal to the fuel injector.

In the preferred embodiment, when the operator desires to start the engine the controller 126 determines the temperature of the fluid. If the temperature is not above a predetermined threshold, indicating the fluid is to cold to achieve good engine performance, then the controller 126 sends a command signal to the heating device to begin heating the fluid. Once the fluid is heated to the desired temperature, the controller 126 disables the heating device 132 and sends an injection command signal to the injector to begin fuel injection into the cylinder in order to start the engine.

Other aspects, objects, and advantages of the present invention can be obtained from a study of the drawings, the disclosure, and the claims.

We claim:

1. An apparatus adapted to heat actuating fluid in a rail passage located within an engine, the rail passage being connected to a fluid inlet of at least one fuel injector, comprising:

a heating device located within the rail passage, said heating device being adapted to heat the actuating fluid, said heating device being adapted to be energized in response to a control signal;

a temperature sensing device located within the rail passage, said sensing device being adapted to sense a temperature of the actuating fluid and responsively generate a temperature signal; and a electronic controller adapted to receive said temperature signal, responsively determine a temperature of said actuating fluid, generate said control signal and deliver an injection command signal to the fuel injector in response to said actuating fluid temperature.

2. An apparatus, as set forth in claim 1, wherein said heating device includes at least one glow plug located within the manifold.

3. An apparatus, as set forth in claim 1, wherein said heating devices includes a heating coil located within the manifold.

4. A method of heating actuating fluid in a rail passage located within an engine, the rail passage being connected to a fluid inlet of at least one fuel injector, comprising the steps of:

determining a first temperature of the actuating fluid;

energizing a heating element located in the rail passage in response to the first temperature; and delivering an injection command to the injector in response to the first temperature of the actuating fluid.

5. A method, as set forth in claim 4, further comprising the steps of:

comparing said first temperature to a temperature threshold;

energizing said heating element in response to said first temperature being less than said temperature threshold;

determining a second temperature;

comparing said second temperature to said temperature threshold; and de-energizing said heating element when said second temperature is one of greater than and equal to said temperature threshold.

* * * * *